(12) United States Patent
Cregger (10) Patent No.: US 8,404,173 B2
(45) Date of Patent: *Mar. 26, 2013

(54) POLYMER OBJECT OPTICAL FABRICATION PROCESS

(75) Inventor: Robert Brian Cregger, La Jolla, CA (US)

(73) Assignee: POOF Technologies, LLC, Safety Harbor, FL (US)

( * ) Notice: Subject to any disclaimer, the term of this patent is extended or adjusted under 35 U.S.C. 154(b) by 25 days.

This patent is subject to a terminal disclaimer.

(21) Appl. No.: 12/830,452

(22) Filed: Jul. 6, 2010

(65) Prior Publication Data

US 2011/0006459 A1    Jan. 13, 2011

Related U.S. Application Data

(63) Continuation-in-part of application No. 11/561,191, filed on Nov. 17, 2006, now Pat. No. 7,778,723.

(51) Int. Cl.
*B29C 35/04* (2006.01)

(52) U.S. Cl. ..................................... 264/401

(58) Field of Classification Search .................. 264/401
See application file for complete search history.

(56) References Cited

U.S. PATENT DOCUMENTS

| 4,575,330 | A * | 3/1986 | Hull | 425/174.4 |
| 6,624,915 | B1 * | 9/2003 | Kirkpatrick et al. | 359/3 |
| 7,118,845 | B2 * | 10/2006 | DeVoe et al. | 430/270.1 |
| 2005/0254035 | A1 * | 11/2005 | Frankel | 355/69 |

OTHER PUBLICATIONS

Chatwin et al., UV microstereolithography system that uses spatial light modulator technology, Applied Optics, (vol. 37 No. 32, (Nov. 1998), pp. 7514-7522).*

* cited by examiner

*Primary Examiner* — Yogendra Gupta
*Assistant Examiner* — Robert J Grun
(74) *Attorney, Agent, or Firm* — Cooley, LLP (57) ABSTRACT

High-volume mass-production and customization of complex three-dimensional polymer and polymer-derived-ceramic microstructures are manufactured in a single step directly from three dimensional computer models. A projection based non-degenerate two-photon induced photopolymerization method overcomes the drawbacks of conventional one and two-photon fabrication methods. The structure includes dual, synchronized, high-peak power, pulsed femtosecond and picosecond lasers combined with spatial light modulation. Applications include high-resolution rapid prototyping and rapid manufacturing with an emphasis on fabrication of various Micro-Electro-Mechanical Systems (MEMS) devices, especially in the area of MEMS packaging.

20 Claims, 7 Drawing Sheets

POLYMER OBJECT OPTICAL FABRICATION PROCESS

CLAIM OF PRIORITY

This is a continuation in part application and claims priority to U.S. Utility application Ser. No. 11/561,191 titled "POLYMER OBJECT OPTICAL FABRICATION PROCESS" filed on Nov. 17, 2006 now U.S. Pat. No. 7,778,728.

FIELD OF TECHNOLOGY

This invention relates, generally, to microstereolithography. More particularly, it relates to a non-degenerate two-photon approach to projection microstereolithography.

BACKGROUND

Microstereolithography enables the manufacturing of small and complex three-dimensional components from plastic materials. One-photon polymerization is a process that causes a photo-initiator monomer concentration to induce a photochemical reaction, which in turn causes the concentration to cross-link and solidify.

The process is the basis for most commercially available stereolithography systems. Two-photon polymerization is a technique for the fabrication of three dimensional micron and sub-micron structures. A beam of ultra fast infrared laser is focused into a container holding a photo-sensitive material to initiate the polymerization process by non-linear absorption within the focal volume. By focusing the laser in three dimensions and moving the laser through the resin, a three dimensional structure can be fabricated. Two-photon microstereolithography enables three dimensional processing as well as high complexity micro-fabrication.

Researchers have demonstrated experimental two-photon micro/nano stereolithography but have not incorporated projection technology into the two-photon fabrication process and have not combined non-degenerate two-photon photopolymerization based on intersecting femtosecond pulsed projected images with picosecond pulsed laser light sheet at the focal plane. Existing two-photon stereolithography techniques enable unlimited complexity in the part geometries that can be fabricated by polymerizing a single focal volume voxel inside the bulk volume of photopolymer via the two-photon absorption process. However, these systems are limited in the volume that can be fabricated in a timely manner due to the point-by-point fabrication approach.

These systems also require ultra-precision control of translation or minor steering systems to generate parts of adequate resolution at the micro scale. The trend of everincreasing two-photon absorbing cross-sections of photoinitiators explicitly tailored for two-photon processes in recent years suggests that the speed of the scanning minor systems will also present some limitations in two-photon stereolithography now and in the future.

One-photon based microstereolithography techniques fabricate in a surface layer-by-layer approach that ultimately limits the process to rapid prototyping and some small production runs of micropolymer structures. The surface layer-by-layer approach also limits the geometries of objects that can be fabricated due to surface tension or release layer issues, and requires an extensive network of support structure to be digitally inserted into three-dimensional models via support structure insertion algorithms. All of these factors limit the fabrication process and slows the overall throughput of micropolymer structures.

There also exists a gap between prototyping of complex micro geometries using microstereolithography and mass production of complex geometries. The ideal microstereolithography device would allow any complexity in geometry, need no support structure, and enable rapid prototyping, mass-production, and mass customization from a single machine. Two-photon absorption can occur in two forms: degenerate and non-degenerate. The process is known as degenerate if the photons absorbed are of the same wavelength. The process is known as non-degenerate when the photons absorbed are of two-different wavelengths. Nearly all of the research conducted on two-photon polymerization has been limited to degenerate schemes using a single focused laser beam.

Non-degenerate two-photon polymerization, using two lasers of two different wavelengths, increases set-up costs, requires optical hardware having a more complex configuration and dual laser pulse synchronization. However, a non degenerate configuration offers distinct advantages that have an impact on the overall throughput and versatility of the fabrication system. Non-degenerate systems offer more control over the geometry of the reaction volume due to the fact that the reaction volume is confined only to the overlapping beams of the appropriate wavelengths.

The rate of degenerate two-photon absorption, in a dual intersecting beam degenerate two-photon configuration, increases where the two beams intersect but photo-absorption also occurs in the light path prior to the desired reaction volume if the beams enter a sample already tightly collimated, or at a low numerical aperture. This configuration causes some two-photon absorption (TPA) in the beam delivery paths with an increase in absorption occurring at the intersection of the two beams, thus limiting the overall irradiance that is deliverable to the desired fabrication volume. This situation also limits the achievable speed of photopolymerization and feature size resolution.

For two-photon polymerization photon absorption in the beam's delivery path is an undesired effect and is solved by implementing a focusing scheme with a high numerical aperture. The increase in the probability for absorption to occur as the beam approaches the focal point reduces the possible degenerate configurations to designs that have a high numerical aperture objective lens. Thus there is a need for a two-photon projection microstereolithography method that incorporates a non-degenerate two-photon approach to projection micro stereolithography but which is not subject to the limitations of the known methods. However, in view of the art considered as a whole at the time the present invention was made, it was not obvious to those of ordinary skill in this art how the identified needs could be met.

SUMMARY

The long-standing but heretofore unfulfilled need for improvements in microstereolithography is now met by a new, useful and nonobvious invention. The novel two-photon projection microstereolithography process_incorporates an innovative non-degenerate two-photon approach to projection_microstereolithography.

More particularly, non-degenerate two-photon_absorption enables single-step, all digital, mass fabrication of micropolymer or_polymer-derived-ceramic structures of virtually any three-dimensional geometry_directly from computer model design files. This single-step fabrication process is for convenience referred to as the Polymer Object Optical Fabrication (POOF)_process, which acronym suggests the extremely fast microfabrication of three-dimensional_micro polymer structures of unlimited complexity in part geometry_including virtually any aspect ratio desired.

The POOF process further evolves the known stereolithography process by taking a projection-based, non-degenerate two photon induced photopolymerization (TPIP) approach to stereolithography. Incorporating a spatial light modulator such as Texas Instrument's Digital Light Processor (DLP™) projection technology into the two-photon fabrication process introduces a highly parallel approach to microstereolithography that substantially reduces or eliminates the need for support structure, provides unlimited part geometrical complexity (within a finite range of micro resolution smallest feature sizes) in resulting parts, and provides the optical and mechanical configuration that enables rapid prototyping, high-volume mass-production, and mass-customization of micro polymer and micro-polymerderived-ceramic structures from a single machine in a single step.

This process is used in conjunction with photoinitiators with a high two-photon absorption cross-section combined with various acrylates, vinyl ethers, epoxies, bio-degradable hydrogels, elastomers, or polymer-derived-ceramics to make complex microstructures for Micro Electro Mechanical Systems (MEMS) and integrated complex three-dimensional optical circuitry for MicroOptoElectroMechanical (MOEMS) devices for a wide range of industries. POOF technology will be an integral tool in the development of polymer and ceramic-based MEMS and MOEMS technologies with a special emphasis on packaging fabrication for current and emerging MEMS and MOEMS' devices.

The fabrication capability of the POOF process enables the fabrication versatility and throughput of micro geometries currently not feasible with existing fabrication techniques.

DETAILED DESCRIPTION

This invention includes a method for the patterned solidification, desolidification, or modification of the index of refraction of a photo reactive material by non-degenerate two-photon absorption thereby providing rapid fabrication of three-dimensional micro-structures directly from computer models.

The steps of the novel method include: Placing a medium capable of selective solidification, desolidification, or refractive index modification via non-degenerate two-photon absorption into a container having at least one optically transparent window so that the medium within the container is accessible by laser light. In the alternative, the entire container may be made of an optically transparent material; Providing an array of controllable pixel elements; Selecting two synchronized pulsed laser sources having respective wavelengths to induce non-degenerate two-photon polymerization; Providing an optical projection system for projecting patterned images of femtosecond pulsed laser light; Directing femtosecond laser pulses onto the array of pixel elements, so that a desired patterned portion of source light travels through the window of the container and into the photoreactive material and focuses inside the photoreactive material;

Providing an optical system for producing the sheet of light of picosecond pulsed laser light so that sheet has an optimal thinness and flatness, Aiming the femtosecond patterned light and the picosecond sheet of light so that they intersect one another orthogonally with the two focal planes overlapping. More particularly, directing picosecond pulses in a thin, flat sheet so that said picosecond pulses intersect with the femtosecond pulses, such that the thin, flat sheet of picosecond pulses intersects the source light perpendicular to the projected source from the array of pixel elements so that select regions of the photoreactive material are cured at the intersection;

Positioning the container and the photoreactive material therewithin relative to the intersecting focal planes at an angle less than the critical angle of the container material and photoreactive material; Monitoring the real-time velocity of the container through the light intersection region by employing a velocity sensor; Providing a computer control system that sends electronic data for each image pattern to be projected from the controllable pixel element where the refresh rate of the controllable pixel array is throttled according to the velocity data obtained from the velocity sensor. In the alternative, the feedback could alter the conveyor speed, control the laser repetition rate, the light path length, or the controllable pixel array. A finely tuned system may not require feedback;

Providing a computer-executable program for extracting a series of slices of a three-dimensional computer model data into a series two-dimensional image files that are compatible with the controllable pixel elements; Sequentially sending the sequence of two-dimensional images extracted from the three-dimensional computer model file to the controllable pixel array, thereby enabling projection of the slices of the computer model file into the medium as the medium volume translates through the intersecting focal planes at a velocity determined by the photo reactive cure time of the photoreactive material and the real-time velocity feedback data; and Synchronizing overlapping pulses operating at two different wavelengths that are of preselected energies to meet the combined energy requirements necessary to achieve non-degenerate two-photon absorption in the beam intersection volume within the photoreactive material.

The array of controllable pixel elements may include a spatial light modulator and the spatial light modulator may include a plurality of mirrored surfaces each independently pivotable from a first to a second position or state allowing directional control of the area of light reflecting from each mirror. The spatial light modulator is controlled by digital electronics that modify each mirror state by loading a binary array of data. Each bit of data in the binary image array determines the directional pivot of the mirror thus providing spatially patterned projection of laser pulses. The binary array of mirror state data is provided by two-dimensional slice plane image data that is programmatically extracted from a three-dimensional computer model.

The two-dimensional slice plane data extracted from the computer model is in some cases an exact two-dimensional cross-section replica of the desired fabrication geometry and in other cases the extracted slice plane data is processed in such a way as to use the spatial light modulator as a digital programmable holographic grating capable of projecting a holographic image into the medium. The illuminating pulsed laser light of the spatial light modulator is a femtosecond pulsed laser source.

An optical system couples with the spatial light modulator to form a laser illuminated projector that has an aspheric beam shaping condenser lens placed prior to and directed onto the spatial light modulator, a micromirror array spatial light modulator, and a reducing imager lens placed post spatial light modulator and focused to intersect sheet of light. This invention is not limited to a micromirror array spatial light modulator. There are many types of spatial light modulators and all of them are within the scope of this invention.

The aspheric condenser lens redistributes the Gaussian energy distribution of the femtosecond laser light to form a more even energy distribution across the spatial light modulator and thus across the projected focal plane, and the projected image is directed into a region that will allow intersection with the picosecond light sheet and allow the medium and windowed container/cuvette to pass through the intersection region.

Alternatively, the optical imager lens can be used to expand or reduce the total area of the projected image thus decreasing or increasing the build resolution respectively. The sheet of light optical system is capable of creating a thin sheet of pulsed radiance energy from the picosecond source using an aspheric beam shaping cylindrical lens set placed between the picosecond laser source and the beam intersection volume or "fabrication plane." The aspheric beam-shaping cylindrical lens set redistributes the picosecond laser light Gaussian energy distribution to form a more even energy distribution across the thin light sheet.

The thin sheet of pulsed energy is directed into the vat perpendicular to the focal plane of the femtosecond projected image. Alternatively, the sheet of light optical system can be designed from a diffractive optical element that forms a sheet of light that intersects the focal volume of the projected source. The photoreactive material includes a highly efficient two-photon photoreactive initiator material combined with compatible fast reacting monomers such as acrylates, vinyl ethers, epoxies, biodegradable hydrogels, elastomers, or polymer-derived-ceramics.

The medium may be a liquid resin that is solidified upon exposure to the intersecting beams thus allowing microstructure fabrication. It may also be a solid that is desolidified upon exposure to the intersecting beams thus allow microstructure fabrication. It may also be a material with the capability of altering the index of refraction thus enabling the fabrication of waveguides.

The novel POOF process incorporates a spatial light modulator such as Texas Instrument's digital light processor (@LP™) Projection technology into a two-photon fabrication process. It requires a non-degenerate approach to the TPIP process due to the geometry of the projected light entering the bulk volume of the polymer. The POOF process further requires that the projection system be illuminated by a high peak-power, femtosecond, pulsed, laser source operating at a specific wavelength $\lambda_1$ which projects a series two dimensional slices of a three dimensional computer model.

The pulsed image is projected into the bulk fabrication volume of photopolymer material through a reducing imager lens of approximately 1.1:1 or greater reduction A high peak-power, nanosecond, pulsed, very thin, flat sheet of laser light operating at a specific wavelength $\lambda_1$, orthogonally intersects the pulsed image at the focal plane of the projection imager lens. At this junction of the femtosecond pulsed image and the thin sheet of picosecond pulsed light the two different wavelengths of light, $\lambda_1$ and $\lambda_2$, will induce non-degenerate TPA thus initiating the free-radical or cationic TPIP process of an entire digitally patterned two-dimensional slice of a computer model in each synchronized dual pulse intersection.

This intersection of femtosecond projected pulsed images intersecting with picosecond pulsed sheet of light is a significant feature of the invention. Non-degenerate two-photon absorption increases the overall complexity of the machine design by requiring two synchronized pulsed lasers. However, another advantage in implementing this configuration exists in the versatility to alter the beam intersection geometry. This allows alteration of the fabricated voxel geometry. Non-degenerate two-photon scheme also enables utilization of lower numerical apertures in a two-photon polymerization process.

This versatility is inherent in the non-degenerate two-photon absorption process because two-photon absorption will only occur in the volume of the pulses intersection where the combined irradiance of each beam plays a contribution to meeting the quadratic irradiance dependence required for TPIP. To ensure an optimized microstereolithography process capable of high volume mass production, the projected image is directed into a vat or cuvette at an angle less than the critical angle of the a transparent vat/cuvette wall and the photopolymer material. This critically important aspect of the POOF configuration meets five crucial conditions during the fabrication of the desired object: A) a static focal plane, B) substantially static optical components in the optical path (excluding minute vat vibration), C) constant velocity translation in a single axis, D) substantially turbulence free photopolymer build volume, and E) an array of up to 4.1 million fabricated voxels digitally projected via a high performance spatial light modulator such as the extremely high performance Texas Instrument's Digital Micromirror Device (DMD).

From an optical, mechanical, and software design perspective, meeting these five important design constraints produces a microstereolithography process that is optimized for high-speed, high-volume microfabrication. Meeting these design constraints also identifies the overall novelty of the POOF technology in an all digital, high-speed, non-degenerate two photon, projection, microstereolithography device for high-volume 3D microfabrication of any geometry.

The basic POOF system includes an enclosed transparent vat containing a two-photon photoinitiator monomer concentration that is meets the criteria of one-photon optical transparency of each of the POOF process's dual synchronized lasers.

The vat is mounted to a low vibration translation system that translates the vat at a constant velocity through the fabrication plane where the pulsed image and sheet of light intersect. The DLP™ Projection system projects a series of high peak power femtosecond pulsed cross-sectional CAD model slice image at a refresh rate defined by the velocity of the translation system and the polymerization rate of the photoreactive material. A picosecond pulsed thin sheet of light is synchronized to intersect the projected pulsed image in the focal plane. Because of numerical apertures of the light entering the photopolymer volume, the wavelength of light, and the irradiance of the pulsed laser light neither single beam alone can induce immediate TPIP. A liquid volume goes in and "POOF," the three-dimensional part is produced. The thickness of each fabrication slice is determined by the non-degenerate TPIP dynamics of the spatial thickness of the sheet of light interacting with the temporal length of the femtosecond projected pixel in the physical intersection geometry and also by any diffusion of the light as photopolymerization occurs and the termination coefficient of the polymer chain during the reaction.

Further empirical exploration of the intersection beam geometries, with each of the best material candidates, is required to determine the optimal balance of intersecting femtosecond pulse energy dose and picosecond pulse energy dose range that will induce non-degenerate TPIP without causing thermal damage during the fabrication process while maintaining the highest possible throughput of the system.

The POOF process laser systems and optical systems are chosen by meeting the criteria that TPIP occurs only in the intersection volume of the laser beams. Exposing the photopolymer material to either the projected femtosecond pulsed image of wavelength. $\lambda_1$ or the picosecond pulsed sheet of light of wavelength $\lambda_2$, alone will not induce immediate TPIP. Only where the beam operating at $\lambda_1$ intersects with a second beam operating at $\lambda_2$, where $\lambda_1$ and. $\lambda_2$, are of the appropriate combined energies, will the energies sum to induce immediate TPIP.

The picosecond pulse sheet thickness and collimation is constrained to an irradiance limitation below the irradiance induced damage threshold of the photopolymer materials. The optimal theoretical light delivery system working in conjunction with the optimal chemical and hardware configuration facilitates a process capable of high volume production of polymer-based micro-structures with the unprecedented combination of three-dimensional complexity, feature size resolution, and volume throughput. Several conceptual TPIP projection POOF design configurations for mass production are depicted in the drawings that include designs for rapid prototyping or rapid manufacturing of polymer or polymer-derived-ceramic microstructures and a design for high resolution rapid prototyping of micro-feature build resolution of macrostructures.

To fully optimize the overall throughput of this system an optional hardware addition to the overall system is realized by incorporating a magnet that creates a thin, sheet-like, magnetic field across the pulsed light intersection region also called the fabrication region. It is known that photopolymers located in a moderate magnetic field can have an increase in the overall photoefficiency of the photopolymerization process. However, no prior art in the field of stereolithography or TPIP configurations has incorporated a thin magnetic field into the focal region of the incoming light. Increasing the overall photoefficiency of the process results in either lower pulse power requirements to achieve TPIP or an increase in the overall fabrication throughput of the process.

Figure 1:
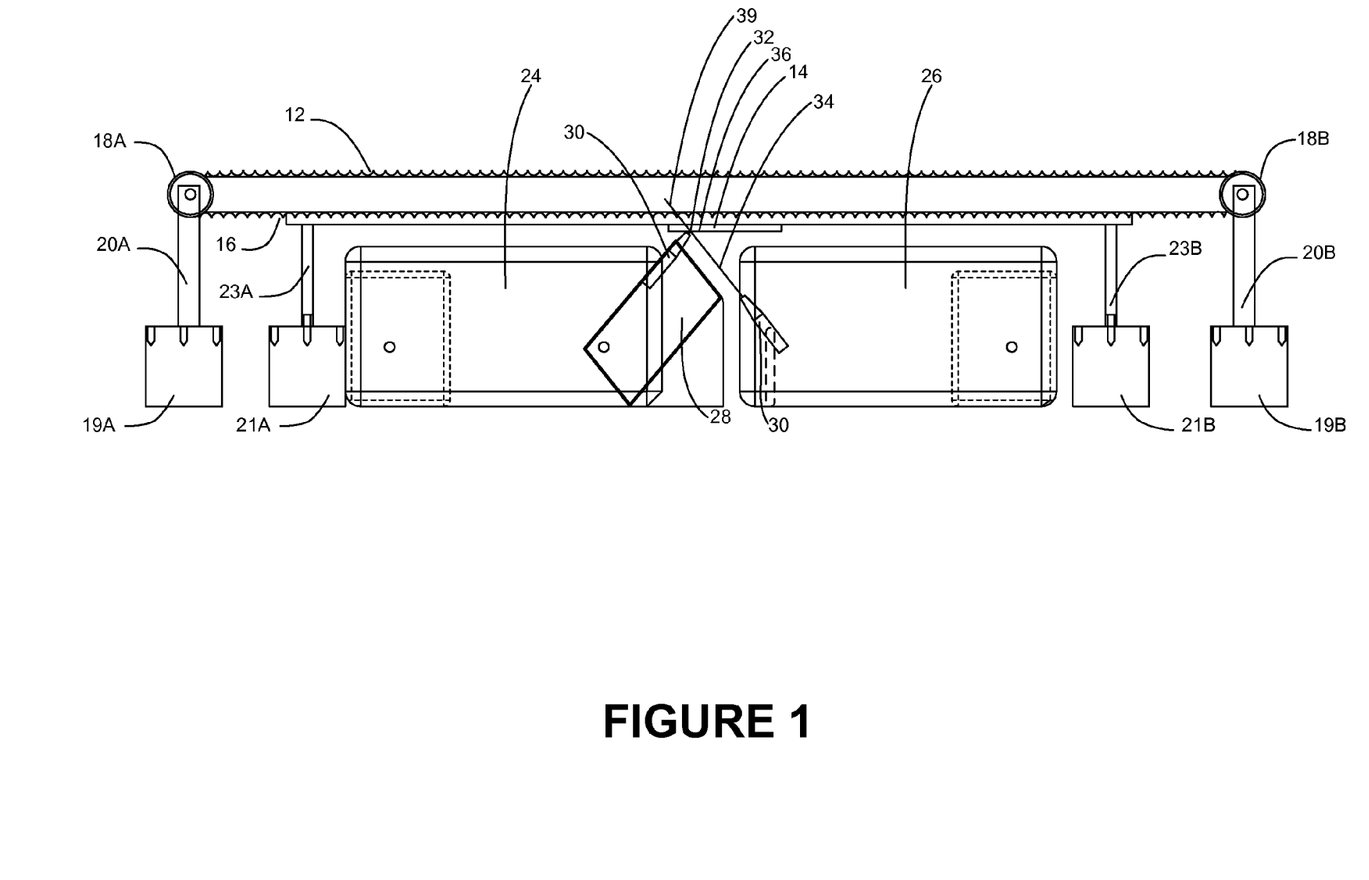
FIG. 1 is a diagrammatic side elevational view of a first embodiment.
Figure 2:
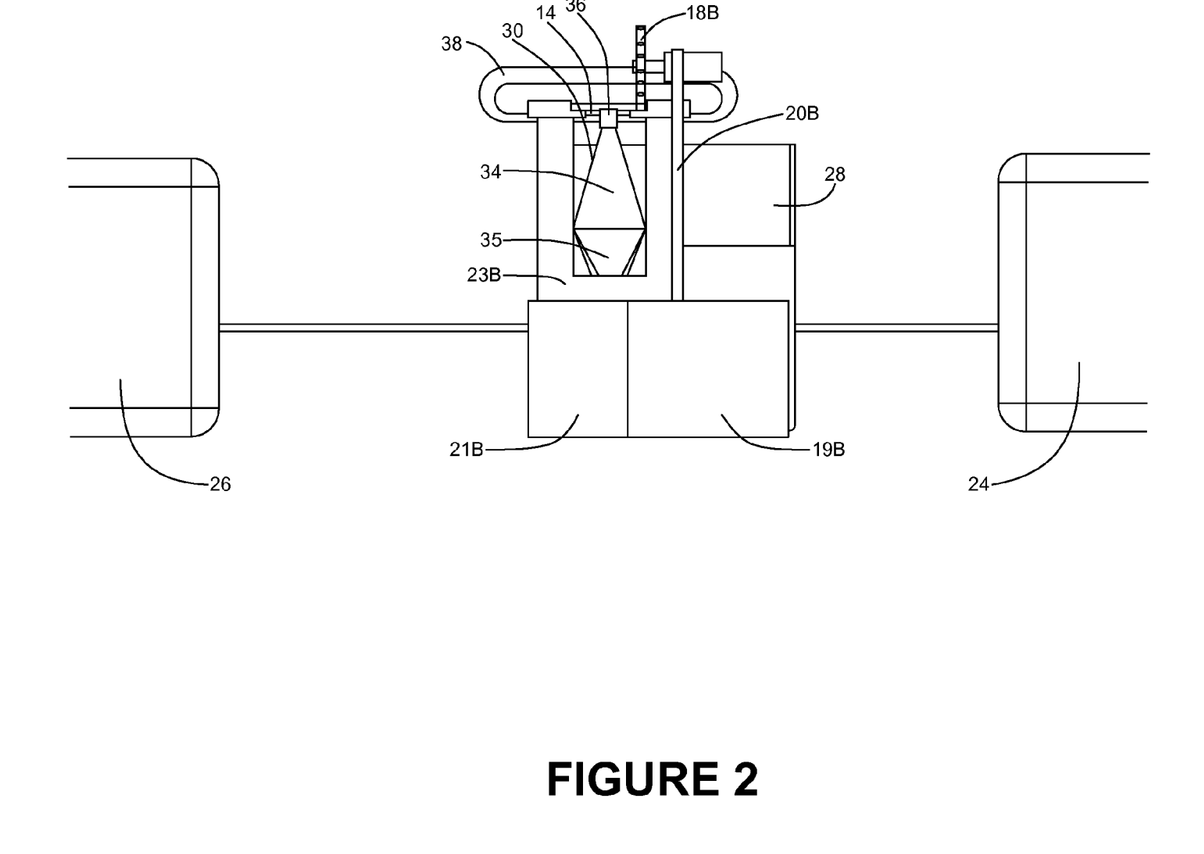
FIG. 2 is a diagrammatic end view of the FIG. 1 structure.
Figure 3:
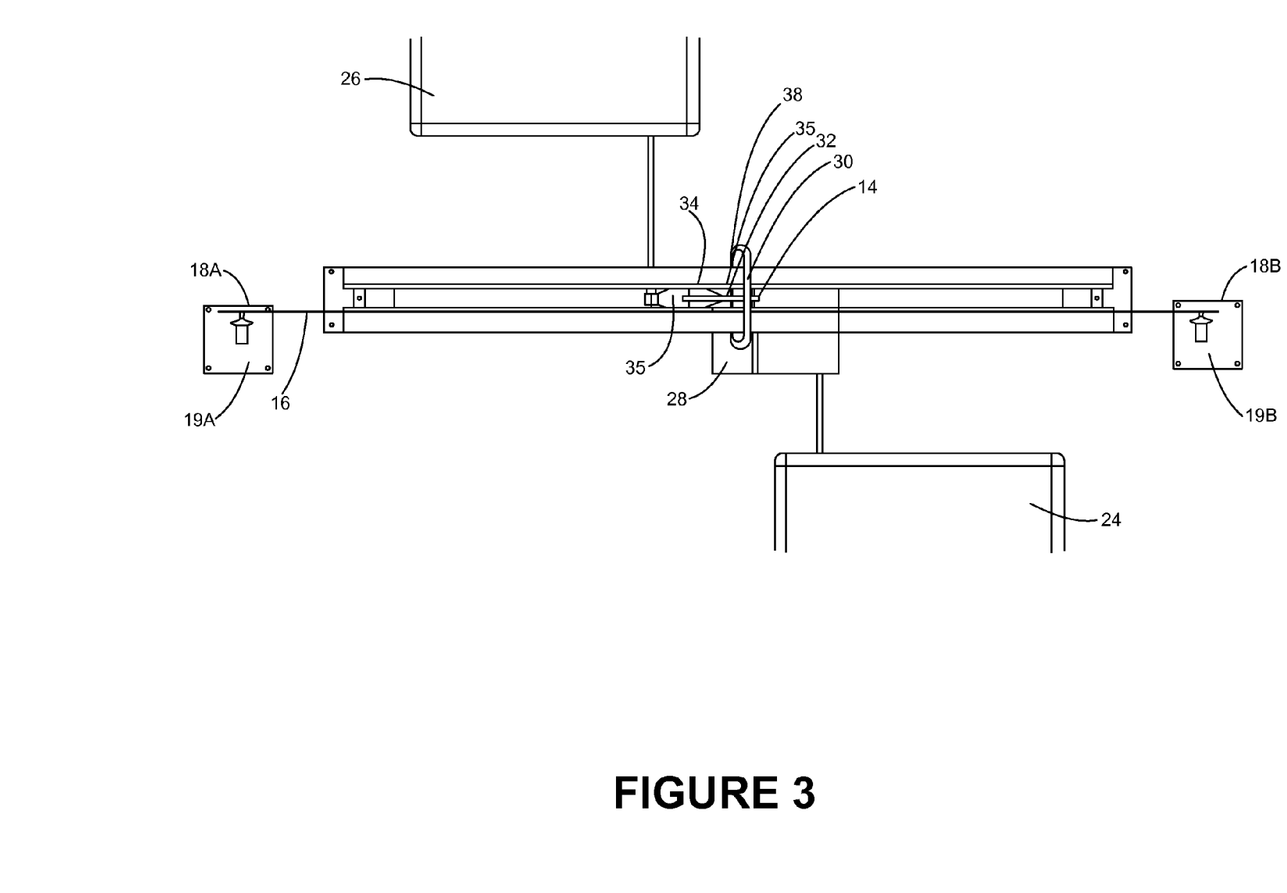
FIG. 3 is a diagrammatic top plan view of the FIG. 1 structure.

FIGS. 1-3 depict a typical set-up, which is denoted as a whole by the reference numeral 10. Conveyor system 12 carries container 14 through the fabrication region. As mentioned above, at least part of container 14 is optically transparent. The depicted conveyor system includes a sprocketed belt 16 that makes a continuous path of travel around sprocket pulleys 18a, 18b that are longitudinally spaced apart from one another and which are respectively supported by vibration isolation base members 19a, 19b having support legs 20a, 20b. Optically flat glass tracks 22 provide a guided path for container 14 through the fabrication region is itself supported by base members 21a, 21 b and support legs 23a, 23b.

Of course, the art of machine design includes numerous equivalent structures for carrying a container along a predetermined path of travel and all of such equivalent structures are within the scope of this invention. The femtosecond pulsed laser is denoted 24 and the picosecond pulsed laser is denoted 26. The spatial light modulation (SLM) projection system associated with femtosecond pulsed laser 24 is denoted 28 and the femtosecond pulsed laser 24 illuminated projection optics is denoted 30.

The femtosecond pulsed laser images projected by SLM projection system 28 are denoted 32. These images are also referred to as the image source light. The flat sheet of picosecond pulsed laser light is denoted 34 is illuminated by the picosecond pulsed laser denoted 26 and formed by the sheet of light optics denoted 35.

Figure 4:
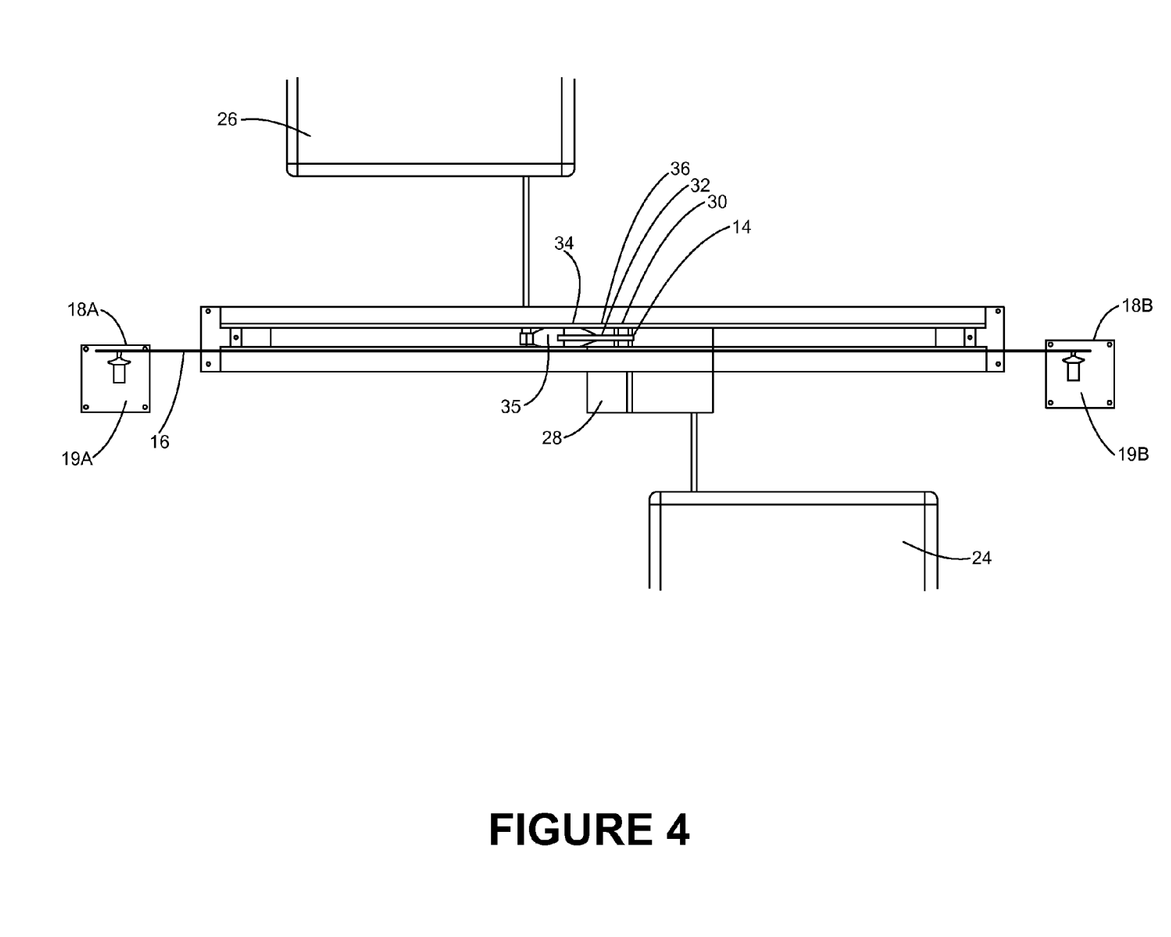
FIG. 4 is a diagrammatic end view of a second embodiment.
Figure 5:
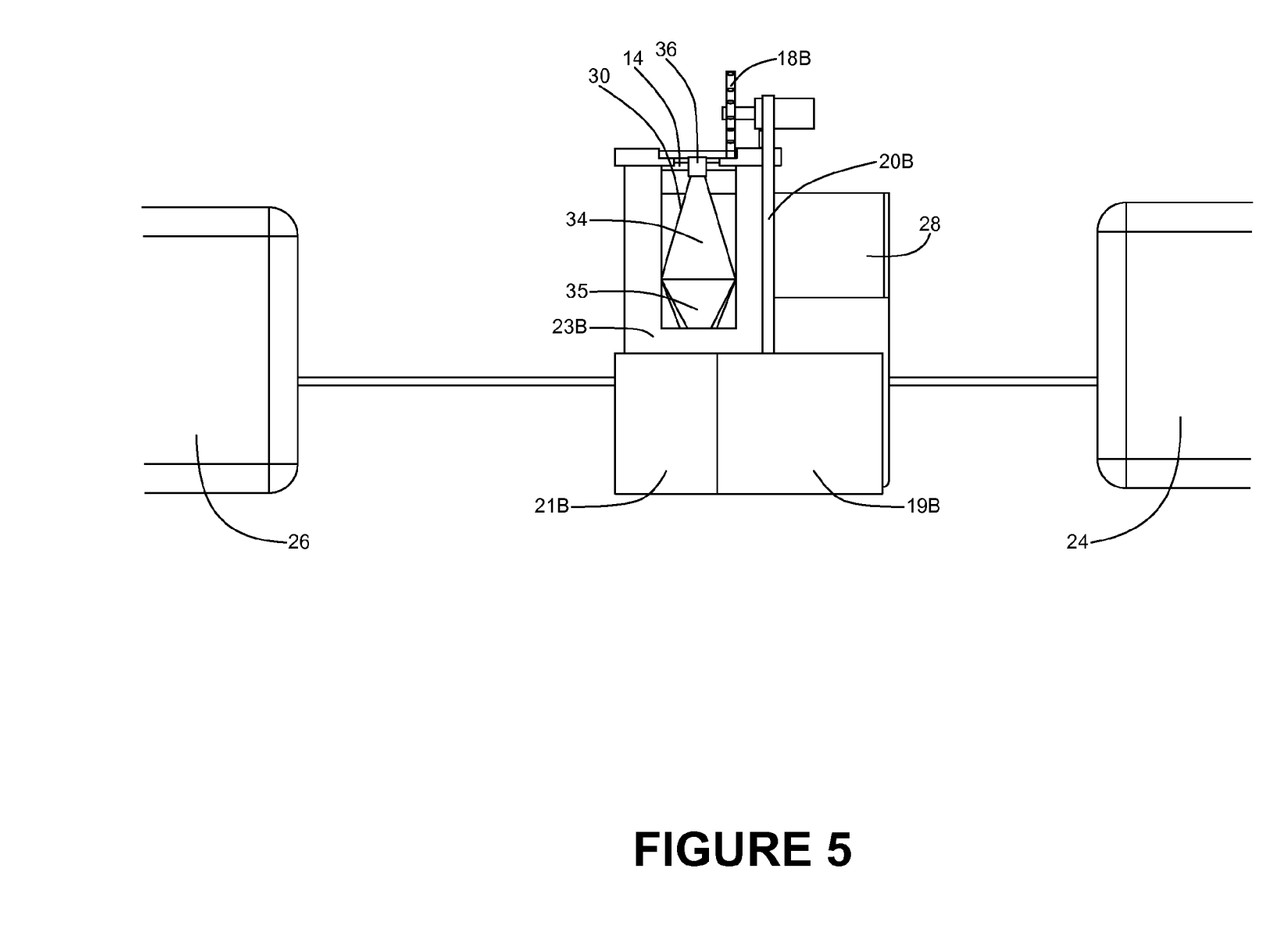
FIG. 5 is a diagrammatic side elevational view of the second embodiment.

The intersection where the synchronized laser pulses meet, i.e., where images 32 meet flat sheet 34, is denoted 36. Intersection 36 is the fabrication region. Thin magnet 38 is positioned in an inclined plane and intersects fabrication region 36. The structure diagrammatically depicted in FIGS. 4 and 5 differs from the structure of FIGS. 1-3 in that no magnet 38 is provided in this embodiment.

Figure 6:
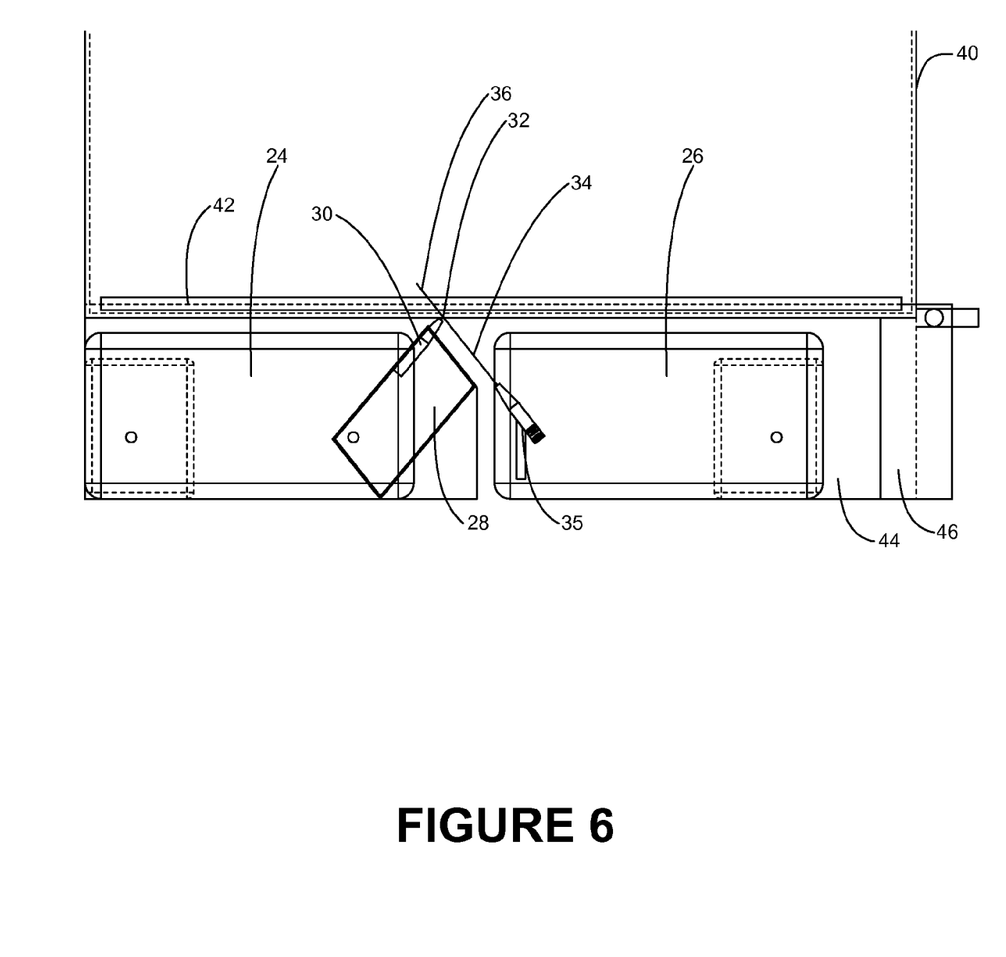
FIG. 6 is a diagrammatic side elevational view of a third embodiment.
Figure 7:
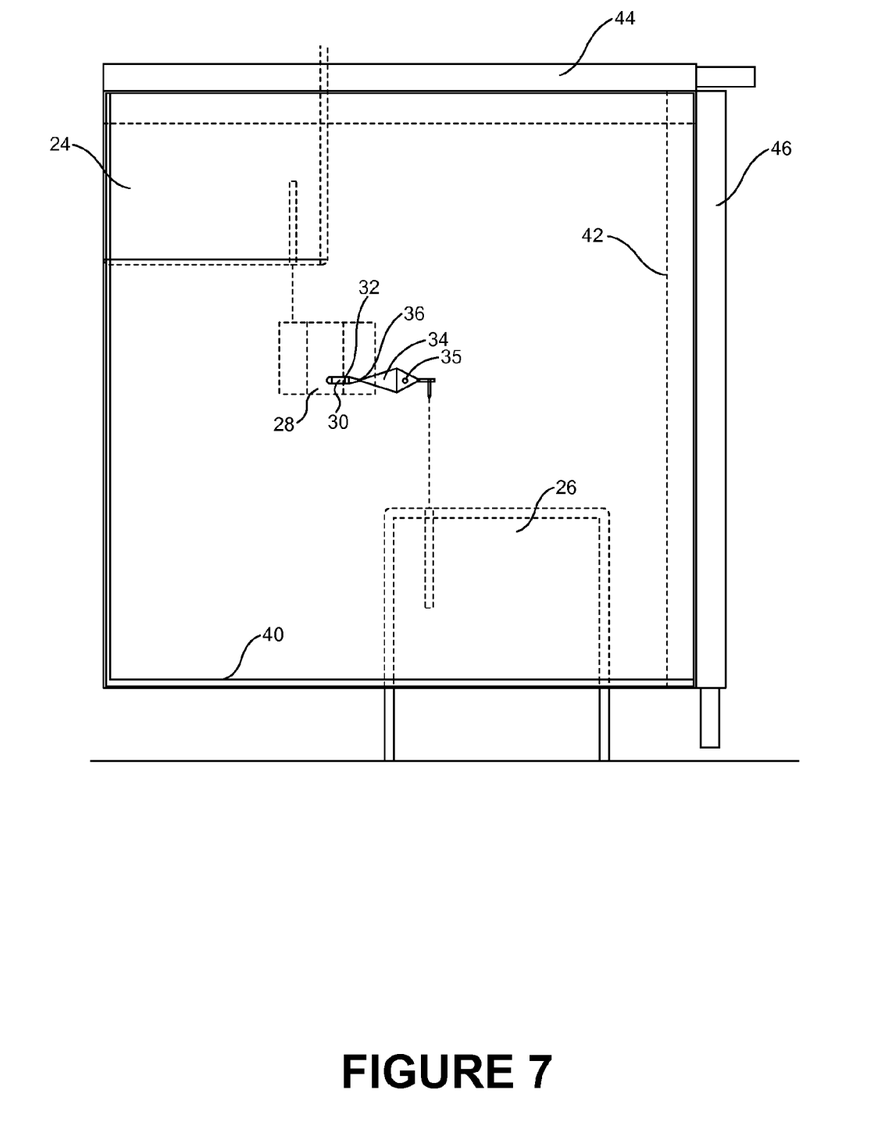
FIG. 7 is a diagrammatic top plan view of said third embodiment.

In all other respects, the structure is the same as indicated by the reference numerals, which are common to FIGS. 1-5. A third embodiment is depicted in FIGS. 6 and 7. Most of the functional parts are the same as in the first two embodiments as indicated by the common reference numerals. However, instead of a relatively small container 14 that contains the photoreactive material, a large vat 40 contains said material.

Vertical lifting platform 42 is positioned inside said large vat and suitable means are provided for elevating said platform 42 in increments that correspond to the vertical height of the fabrication region 36 as the inventive method is performed. Vat 42 is supported by a dual axis translation system that includes rigid arms 44, 46 disposed at a right angle relative to one another at the base of vat 42, externally of said vat. Translation of vat 42 along an x-axis is controlled by arm 44, along a y-axis by arm 46, and along a z-axis by vertical lifting platform 20 42. The z-axis is perpendicular to the plane of the paper in FIG. 7. In this way the photoreactive material is moved through fabrication region 36 as vat 40 is translated along said axes under the control of a computer.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described.

What is claimed is:

1. A method for fabricating three-dimensional micro-structures directly from computer models, the method comprising:
    placing a photoreactive material into a container wherein at least a part of the container is optically transparent so that said photoreactive material is accessible by light;
    modifying said photoreactive material by non-degenerate two-photon absorption, wherein said modifying includes:
        directing, inside said photoreactive material, one or more first light pulses comprising a pulsed patterned source light having a first wavelength range so as to form an image of pulsed patterned source light;
        directing, inside said photoreactive material, one or more second light pulses having a second wavelength range so that the one or more second light pulses intersect the image of pulsed patterned source light and preselected portions of the photoreactive material are modified within a fabrication region, wherein said first wavelength range is different from said second wavelength range;

whereby at least certain photons of the one or more first light pulses intersect with at least certain photons of the one or more second light pulses to effect non-degenerate two-photon absorption within said photoreactive material.

2. The method of claim 1, wherein said modifying further includes patterned modification to produce at least one of:

solidification of said photoreactive material in accordance with a first pattern associated with said patterned modification, desolidification of said photoreactive material in accordance with a second pattern associated with said patterned modification, and modification of the index of refraction of said photoreactive material in accordance with a third pattern associated with said patterned modification.

3. The method of claim 1, wherein said directing one or more first light pulses comprises directing femtosecond laser pulses onto an array of pixel elements so that said array of pixel elements induces at least in part said pulsed patterned source light said method further comprising:

synchronizing said pulsed patterned source light and said second light pulses:

aiming said pulsed patterned source light so that said pulsed patterned source light travels through an optically transparent part of said container into the photoreactive material and focuses inside said photoreactive material, at one or more selected portions of said fabrication region;

wherein said directing one or more second light pulses comprises directing picosecond pulsed laser light and focusing said picosecond laser pulses into a flat, thin sheet of laser light that intersects the pulsed patterned source light from the array of pixel elements, said intersection being positioned so that said one or more preselected portions of the photoreactive material are modified within said fabrication region;

directing said container having said photoreactive material therein through said fabrication region;

whereby synchronized overlapping pulses operating at two different wavelengths of preselected energies meet combined energy requirements necessary to achieve nondegenerate two-photon absorption in the fabrication region within said photoreactive material.

4. The method of claim 1, wherein a first laser produces said one or more first light pulses and a second laser produces said one or more second light pulses.

5. The method of claim 1, wherein the image of pulsed patterned source light is at least one of a holographic image or a two dimensional image.

6. The method of claim 1, wherein said pulsed patterned source light is induced at least in part by at least one of a spatial light modulator, an array of pixel elements, a holographic grating, and a micromirror array spatial light modulator.

7. A method for inducing selective non-degenerate two-photon absorption events to occur, the method comprising:

directing, at a medium, at least one pulse of photons comprising photons of a first wavelength range to populate an event region inside said medium;

directing, at said medium, at least one patterned pulse of photons comprising photons of a second wavelength range to populate said event region, wherein:

said medium comprises a material that is susceptible to a non-degenerate-two-photon absorption of a photon of the first wavelength range and a photon of the second wavelength range, and said at least one pulse of photons of said first wavelength range and said at least one patterned pulse of photons of said second wavelength range are directed such that non-degenerate two-photon absorption events occur at selected locations in the medium within the event region due to the coexistence of selectively positioned photons of said first wavelength range and selectively positioned photons of said second wavelength range of photons.

8. The method of claim 7, wherein energies of the photons of the first wavelength range and the photons of the second wavelength range meet combined energy requirements to achieve non-degenerate two-photon absorption without causing at least one of:

unwanted thermal effects and thermal damage.

9. The method of claim 7, wherein the temporal pulse lengths of pulses of the first wavelength range and the second wavelength range meet the requirements to achieve selective non-degenerate two-photon absorption events without causing at least one of;

unwanted thermal effects and thermal damage.

10. The method of claim 7, wherein the at least one pulse of photons of the first wavelength range is selected to be of a temporal duration to populate a selected thickness of the event region.

11. The method of claim 7, wherein exposing the material to the photons of the first wavelength range alone or exposing the material to the photons of the second range alone does not induce two-photon absorption.

12. The method of claim 7, wherein said at least one patterned pulse of photons is induced at least in part by at least one of a spatial light modulator, an array of pixel elements, a holographic grating, and a micromirror array spatial light modulator.

13. The method of claim 7, wherein said at least one patterned pulse comprises at least one of a holographic image and a two dimensional image.

14. The method of claim 7, wherein a first laser produces said at least one pulse of photons comprising photons of a first wavelength range and a second laser produces said at least one patterned pulse of photons comprising photons of a second wavelength range.

15. The method of claim 7, wherein said non-degenerate two-photon absorption events produce at least one of: solidification of said material, desolidification of said material, and modification of the index of refraction of said material.

16. The method of claim 7, wherein the method is repeated to produce at least one of a three dimensional object, a micro polymer structure, a part, a micro-polymer-derived-ceramic structure, an optical circuit, a microstructure for Micro Electro Mechanical Systems (MEMS), a MEMS package, and a MicroOptoElectroMechanical (MOEMS) package.

17. The method of claim 7, wherein said event region comprises at least one of a two dimensional plane, a flat sheet, and a three dimensional volume.

18. The method of claim 7, wherein the at least one pulse of photons is of a picosecond-scale temporal duration and the at least one patterned pulse of photons is of a femtosecond-scale temporal duration.

19. The method of claim 7, wherein the event region is static.

20. The method of claim 7, wherein said material comprises at least one two-photon absorption peak between a summed energy of two photons of the first wavelength range and a summed energy of two photons of the second wavelength range.

* * * * *